April 30, 1940.  H. ROST  2,198,977
SYNTHETIC INSULATING MATERIAL
Filed May 21, 1936
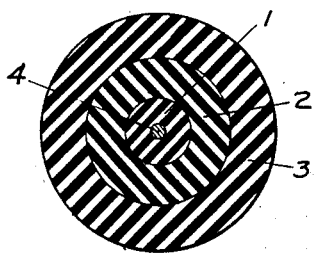
Helge Rost
INVENTOR
BY
ATTORNEY Patented Apr. 30, 1940

2,198,977

UNITED STATES PATENT OFFICE 2,198,977

SYNTHETIC INSULATING MATERIAL

Helge Rost, Stocksund, Sweden

Application May 21, 1936, Serial No. 81,034
In Great Britain June 5, 1935

11 Claims. (Cl. 260—42)

This invention relates to improvements in insulating compounds of the type especially suitable for the efficient insulation of conductors of any form for low and high tension currents, as a liquid insulating medium in transformers, circuit breakers and the like, instead of oil in so-called oil-filled cables, instead of air or gas in so-called pressure cables, and for the insulation of currents in conductors for communication purposes, such as telegraph, telephone, signal and high frequency currents.

An object of my invention is to provide an insulating material composed of one or more synthetic, chemical, organic compounds, the monomer (i. e., the unpolymerized) molecules of each such compound being electrically symmetrical and of substantially zero electric moment.

A further object of the invention is to produce chemical compounds of such character, as may be used in their pure form either as solids or as liquids, and which, in their liquid form, may be substituted for oil in oil-filled cables, or for gas in so-called pressure cables. Besides, one or more of these compounds may be used as plasticizers with other compounds of electrically symmetrical molecules, or as plasticizers for known insulating compounds, whereby their general insulating qualities are substantially improved.

Heretofore, it has been only in extremely rare cases that chemical compounds have been used in their pure state, as insulation for electrical conductors. The usual practice is to mix or plasticize the compounds with different kinds of fillers and/or plasticizers, any of which has a tendency to lower the insulating properties of the basic insulating compounds because of their poor dielectric qualities.

The chemical reaction products according to this invention possess, due to their electrically symmetrical molecules and their substantially zero electrical moments, vastly superior dielectric properties, such as, non-conductivity, low dielectric constant, low phase, angle difference and low dielectric losses, as compared to the insulating materials and plasticizers used heretofore.

According to this invention the chemical reaction product of organic linkage comprised by the insulation should further preferably be a substitution, addition and/or polymerization, and/or condensation product, such substitutions and/or additions of atoms, radicals or side-chains having been made in the chemical reactions, when forming the final product, that the molecules of same are symmetrical.

The chemical reaction product according to this invention is symmetrical and should preferably be saturated and stable. By saturation of chemical reaction products of organic linkage, I mean, that in hydrocarbons or derivatives of same the carbon-atoms are joined by single bonds. By a stable product I mean such a reaction product, as to not be subject to sudden change, nor have further tendency to combine. Symmetrical structures are especially obtained in substitution and/or addition products, for instance, when like substituent atoms, radicals or side-chains are located in balanced positions, as for instance in: Di-, tri-, tetra- and hexa-substituted benzenes; in the ortho- or para- positions of diphenyl-compounds; in the alpha- or beta-positions of naphthalenes; in the alpha-, beta-, and (gamma)-positions of anthracene.

Examples of such chemical reaction products are the following:

Electrically symmetrical, stable aliphatic hydrocarbons of the paraffin series and their symmetrical derivatives as well as their polymerization and/or condensation products, such as:

a. Tetra-substituted methanes of the type $C(a)_4$, where the central carbon is located in the center of a regular tetrahedron, the radicals, atoms or side chains being situated at the four apices. If the radicals or atoms are electrically symmetrical the electric moment of the complete molecule $C(a)_4$ is zero.

Examples: Carbon-tetrachloride, $CCl_4$; pentaerythriol-tetrachloride, $C(CH_2Cl)_4$; carbon-tetra-vinylchloride, $C(ClCH:CH)_4$; carbon-tetra-allylchloride, $C(CH_2CH:CHl)_4$.

All tetra-substituted methane derivatives have zero electric moment, when the four hydrogens are replaced by four like groups in the carbon tetrahedral structures, replacement having been made by such atoms, radicals or side chains which also have substantially zero moment.

b. Saturated stable symmetrical hydrocarbons of straight or normal paraffin series.

Hydrogen atoms in a saturated hydrocarbon molecule can be replaced by methyl groups indefinitely without altering the electric symmetry of the molecule. In conformity with the above statement, the electric moments are zero of the normal paraffins from octane to dodecane, the isomers of heptane and 2,2,4-trimethyl-pentane.

c. Substitution products.

Instead of replacing a hydrogen atom by a methyl group, I may substitute a halogen atom or radical or any other radical with the same result as long as said atoms or radicals are balanced or the direction of the resultant of the electric moment of said radicals or atoms does not show rotation or angle to the line of the C—C bonds. Electrically symmetrical substitution products are obtained, when the substitution atoms, radicals or side chains are placed at the beginning and at the end of the chain.

In isomers, at opposite symmetrical places, especially at the middle of the chain, giving in such a case a balanced structure, for instance: Neo-pentane, 3,3-dimethyl-pentane, or when all the hydrogen atoms are substituted by other kinds of atoms or radicals, for instance, in alkyl-halides, polyhalogen compounds, like hexachlor-ethane, C₂Cl₆; octachlor-propane, C₃Cl₈.

*Electrically symmetrical derivatives of the unsaturated alkyl hydrocarbon series,* their isomers, homologs, addition, substitution and/or polymerization products, like polymerized vinyl-, allyl-, acetylene-, propylene-, butylene-, amylene-, etc., halids, whereby polymerization and/or addition and/or substitution reactions of these unsaturated hydrocarbons occur, yielding paraffin hydrocarbons or derivatives, whereby are formed saturated reaction products of zero electric moment.

*Electrically symmetrical stable hydrocarbon derivatives having carbo-cyclic rings,* their isomers, homologs, addition-, substitution-, polymerization and/or condensation products, such as di-(1:4), tri-(1:3:5), tetra-(1:2:4:5), and hexa-substituted benzenes.

When the doublets formed by groups attached to the benzene ring are symmetrically arranged in the plane of the ring, the electric moment is zero, for instance in:

a. di-substituted benzenes in the para-position like: p-C₆H₄Cl₂; p-diamino-benzene,

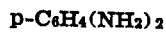

b. tri-substituted benzenes in the meta-positions like: C₆H₃Cl₃ (1:3:5).

c. tetra-substituted benzenes in (2:3:5:6)-positions like: C₆H₂Cl₄.

d. poly-substituted benzenes in all positions like C₆Cl₆.

The groups that preferably can be substituted in benzenes in the para-positions are: Halides, —NH₂, —CH₃, —C₂H₅, C₆H₅—, etc. and in the meta-positions: —CCl₃, —CN, etc., although other substitutes can be used.

Above substitutes can be used also in other carbo-cyclic compounds.

*Addition products of benzene.*—Symmetric hydrocarbon derivatives are obtained in the alpha- or trans-position and in the ortho- and para-positions, when the doublets formed by the groups attached to the ring are not located in the plane of the ring, but in the transpositions, like: trans-benzene-hexachloride, C₆H₆Cl₆; trans-benzene-ortho-dichloride, C₆H₆Cl₂.

*Homologs of benzene.*—The poly-alkyl derivatives of benzene are numerous and important, like hexa-methyl-benzene, C₆(CH₃)₆; hexa-ethyl-benzene, C₆(C₂H₅)₆; mesitylene, (1:3:5-trimethyl-benzene), C₆H₃(CH₃)₃; p-dimethyl-benzene (xylene), C₆H₄(CH₃)₂; 1:2:4:5-tetra-methyl-benzene, C₆H₂(CH₃)₄.

*Polymerization products of unsaturated, electrically symmetrical monomeric benzene derivatives with di-, tri-, and poly-substituted side chains.*

Polymerization products of the following monomeric benzene derivatives with symmetrically arranged substituents in the side chains are not known as insulators, and on account of their symmetrically built monomeric molecules they are specially suitable for insulating purposes;

Alkyl-radicals, their halogen- or other derivatives, isomers and homologs are attached to the benzene ring in symmetrical positions, like di-para-; tri-(1:3:5)-; tetra-(2:3:5:6)-positions. If the radicals attached are not located in a plane, they should be located in transpositions in such a manner, that symmetrical structure is obtained. Examples: para-divinyl-benzene, p-C₆H₄(CH:CH₂)₂; para-C₆H₄(CH:CHCl)₂; para-C₆H₄(CH₂CH:CHCl)₂;

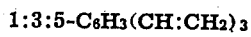

1:3:5-C₆H₃(CH₂CH:CHCl)₃; hexavinylbenzene;

Innumerable substitution products can in the same manner be obtained by changing the substitution—atom, radical or side chain.

*Symmetrical poly-phenyl compounds,* their substitution and/or addition, and their polymerization and/or condensation products, such substitution and/or addition having taken place in any symmetrical positions, for instance para-(4,4')-; 1,1'-; 2,6,2',6'-; 3,5,3',5'-; 2,3,5,6,2',3', 5',6';—or in all positions.

These substitutions can be applied to compounds made up of the pure diphenyl-group or also in the diphenyl-methane, dibenzyl-ortetra-phenyl-methane-groups. Examples: Di-p-vinyl-diphenyl, (C₆H₄)₂(CH:CH₂)₂; di-p-vinylchloride-diphenyl, (C₆H₄)₂(CH:CHCl)₂; di-p-chloreth-ane-diphenyl, (C₆H₄)₂(CH₂Cl)₂; di-p-chloro-di-phenyl, Cl(C₆H₄)₂Cl; di-p-vinyl-diphenyl-methane, (CH:CH₂)C₆H₄.CH₂.C₆H₄(CH:CH₂); di-p-chloro-diphenyl-methane; ClC₆H₄.CH₂.C₆H₄Cl; tetra-styryl-methane, C(C₆H₄.CH:CH₂)₄.

*Symmetrical poly-substitution and/or addition compounds of naphthalene and anthracene,* and their polymerization and/or condensation products, such substitution and/or addition having taken place in any of the following symmetrical positions:

For Naphthalene in the (1,4)-; (1,5)-; (2,6)-; (1,4,5,8)- or alpha-; (2,3,6,7)- or beta-; octo- or (1 to 8)-positions. Examples: ClOH₆(CH:CH₂)₂, (2:6)-divinyl-naphthalene; C₁₀H₄Cl₄, (1,4,5,8)-tetra-chloro-naphthalene; C₁₀Cl₈, octo-chloro-naphthalene.

For anthracene in the (1,5)-; (2,6)-; (9,10)- or gamma-; (1,4,5,8)- or alpha-; (2,3,6,7)- or beta-positions, etc. Examples: (9,10)-dichlor-anthracene, C₁₄H₈Cl₂; (1,5)-divinyl-anthracene, C₁₄H₈(CH:CH₂)₂; etc.

Other examples of symmetrical suitable compounds may be cited:

*Symmetrical polymerization products of unsaturated aliphatic compounds and derivatives,* for instance: Substitution and/or polymerization products of butadien, CH₂:CH.CH:CH₂, like trans-2,3-dimethyl-butadien; diphenyl-butadien, C₆H₅.CH:CH.CH:CH.C₆H₅; diphenyl-2,3-trans-chloro-butadien, C₆H₅.CH.CHCl.CHCl.CH.C₆H₅; para-2,3-trans-dichlor-1,4-butadien-benzene, p-C₆H₄(CH.CHCl.CHCl.CH₂)₂; 2,3-tetrachlor-butadien, H₂C.CCl₂.CCl₂.CH₂; cyclo-hexadien; diphenyl-ethylene, trans-sym-C₆H₅CHCHC₆H₅; aryl-substituted ethylene and the like.

*Condensation and polymerization products,* such as di-substituted ureas and thio-ureas, such as s-diphenyl-urea; s-diphenyl-thiourea and the like.

When the chemical reaction product is a polymerization and a condensation product, as above mentioned for instance, the constituents may be polymerized and condensed in different steps until the desired degree of polymerization and condensation of said constituents has been obtained. These steps offer a convenient way of regulating the final melting point. The polymerization may at first be conducted up to a certain temperature in order to obtain, for instance, the necessary physical properties for forming and applying the dielectric in the desired way, and when this is done the polymerization and/or condensation process can be continued, for instance, by raising the temperature, whereby other physical and final properties are imparted to the dielectric.

As mentioned before in this specification the chemical reaction products in liquid form, according to this invention, can be used as an insulation and/or as an impregnation of known insulations instead of oil in so-called oil-filled cables, instead of compressed gas in so-called pressure-cables, whereby a better result is obtained, due to the fact, that several of the compounds, that can be used for this purpose are of a high viscosity and can penetrate the ordinary insulations of the conductors of said cables at all in service prevalent temperatures.

As these chemical reaction products have excellent insulating qualities, can be made fire-resistant by incorporating atoms of chlor, phosphorous or nitrogen in symmetrical positions of said compounds, they are especially suitable as additional insulation to conductors insulated in hereto known ways both in high-tension cables as mentioned above, as well as in transformers, circuit-breakers and the like, due to the fact that the reaction products according to this invention are pure and symmetrical, and do not contain heterogeneous inclusions as do the oils of unsymmetrical linkages used heretofore.

When a chemical reaction product according to this invention is used as a plasticizer to a known insulating chemical compound, the insulating properties of the resulting composition of matter will have either superior or at least the same insulating properties as said known insulating chemical compounds, while when using present day plasticizers said insulating properties invariably are lowered, due to the heterogeneous inclusions they generally contain and due to the large inherent electric moments of said plasticizers.

A chemical reaction product of the solid type according to this invention can further be applied to an electrical conductor in one or several layers of the same composition, according to known methods, or also in several layers of different or graduated dielectric properties, preferably according to dielectric constant, whereby are used different chemical reaction products for each layer, or also using a known insulating basic insulating chemical compound, to which for each layer has been added plasticizers of different quantities of the same or different chemical reaction products according to this invention.

The application of the reaction products or compositions of matter can be made according to any known method, such as hot extrusion in semi-fluid state and preferably before the preceding layer has had time to cool and harden, or passing the conductor repeatedly through consecutive solutions of respective compounds, letting the solvent evaporate between each immersion. The passing of the conductor is in the case of graduated layers done enough times through the first solution, until sufficient thickness has been obtained, and then through the second, third, etc. solution.

In any application of layers for power cables, however, and according to this invention it is necessary, that the first layer will be intimately united to the conductor and each succeeding layer to the preceding one in such a way (by gluing, cementing or fusing), that voids and gas-pockets are entirely eliminated.

According to this invention and in graduated layers the first layer next to the conductor may have the highest dielectric constant and the outermost layer the lowest dielectric constant.

According to O'Gorman British Patent No. 1568 of 1901 a graduated insulation as per above is known, but besides the graduated insulation of O'Gorman stipulates, that the dielectric constant should be graduated in such a way, that the dielectric constant of each layer should be proportional to the voltage gradient, in order to obtain a uniform voltage drop, throughout the layers.

According to this invention no such stipulation is needed, because the quality of the insulating material and the way same is applied, a uniform voltage drop is immaterial, as will be hereinafter described when the voltage drop can be made still sharper, than if the whole insulation were made from a single homogeneous sheath.

According to this invention an electric power cable can therefore, be made, whereby the insulation of each conductor is composed of layers, the first layer next to the conductor, having the lowest dielectric constant and the outermost layer the highest dielectric constant.

There are cables known having the insulation composed of several layers, the first layer, near the conductor having the highest dielectric properties and each succeeding layer of inferior dielectric properties. A dielectric has, however, several properties apart from the dielectric constant, such as conductivity, disruptive stress, phase angle difference, etc. all of which do not always simultaneously cooperate in producing a good insulation. Thus it might happen, that a dielectric has for instance a high disruptive stress, but a large phase angle difference, such an insulator being undesirable, due to excessive dielectric losses.

According to the present invention, it is sufficient if the layers are graduated according to dielectric constant only, as by using material according to this invention and applying the layers in such a way, that the first layer next to the conductor has the lowest dielectric constant, a highly efficient high-tension cable can be made, whereby the dielectric can be still better utilized.

It is well known that the working voltage of the conductor will be distributed to each composite layer in inverse proportion to its dielectric constant, so that the layer next to the conductor will have the highest dielectric stress per unit thickness.

At first it would appear useless to put layers exposed to dielectric stress outside the first highly stressed layers, although said layers could withstand a much higher stress, but that is not so. Each outside layer will receive less and less stress, although each one of said layers could carry a much higher stress than that to which it will be exposed.

The outside layers, however, will act as a screen to the very highly stressed or perhaps overstressed layers nearer to the conductor, but a breakdown will not occur owing to the fact, that before a breakdown occurs in the first layer, the outside layers must also break down simultaneously and besides there are no voids, air spaces, nor conducting paths between the outside surface of the strand or conductor and the outside layers of the insulation.

As the outside layers have an ample margin of safety, no breakdown through the whole insulation will take place.

By arranging the layers according to this system the best dielectric and the one of the lowest losses is placed, where it is most needed, and owing to the screening effect of the outer layers, the inner layers can be heavily overstressed without harm.

It will be easily understood, that by allowing a much higher stress per unit thickness of insulation next to the conductor, the total thickness of insulation can be made much thinner than is customary and this will make the cable cheaper.

The grading according to dielectric constant of the different layers can be made in several ways, for instance:

1. By using different reaction products of similar consistency, each product having the desired dielectric constant.

2. If a known basic electrical insulating compound is used, different quantities of a chemical reaction product, according to this invention, can be added or incorporated as constituent of said known insulating compound.

Instead of different quantities of the same reaction product, different chemical reaction products can of course be used in suitable quantities as constituents, preferably chemically allied with another and with said basic insulating compound.

The following examples will illustrate above statement:

*Example 1*

1st layer, di-vinylchloride-benzene
2nd layer, tri-vinylchloride-benzene
3rd layer, tetra-vinylchloride-benzene

*Example 2*

1st layer, tetra-vinyl-benzene
2nd layer, tri-vinyl-benzene
3rd layer, di-vinyl-benzene

*Example 3*

1st layer, di-vinylchloride-benzene
2nd layer, di-vinyl-benzene
3rd layer, tri-vinyl-benzene

*Example 4*

1st layer, 100 parts polystyrol
50 parts di-vinylchloride-benzene
2nd layer, 100 parts polystyrol
40 parts di-vinylchloride-benzene
3rd layer, 100 parts polystyrol
30 parts di-vinylchloride-benzene

*Example 5*

1st layer, 100 parts phenol-formaldehyde resin
150 parts diphenyl-butadien
2nd layer, 100 parts phenol-formaldehyde resin
100 parts diphenyl-butadien
3rd layer, 100 parts phenol-formaldehyde resin
50 parts diphenyl-butadien

*Example 6*

1st layer, 100 parts s-diphenyl-urea
150 parts trimethyl-benzene
2nd layer, 100 parts s-diphenyl-urea
100 parts trimethyl-benzene
3rd layer, 100 parts s-diphenyl-urea
50 parts trimethyl-benzene

*Example 7*

1st layer, 100 parts cellulose acetate
50 parts di-chloro-phenyl
2nd layer, 100 parts cellulose acetate
150 parts di-chloro-phenyl
3rd layer, 100 parts cellulose acetate
150 parts di-chloro-phenyl Above examples serve only to show how combinations can be made to obtain variation of the dielectric constant of a cable layer. The quantities and materials expressed are only nominal, and can be varied widely according to the needs of each specific case.

By means of this invention the following advantages are obtained: Due to the homogeneous insulating material of symmetrical molecules of substantially zero electric moment, without heterogeneous inclusions, no conduction paths through the dielectric exists, and therefore no $I^2R$-losses, or when used as plastifying agent in known compounds, said losses will be materially reduced.

The di-electric constant will not change with temperature variations. No hysteresis effects will occur in the dielectric field.

High temperatures, which are the concomitants of great loads may, therefore, be present without danger of breakdown, owing to the graded insulating layers and the compound used.

The arrangement of above mentioned layers are shown in the accompanying drawing, in which a cross sectional view of a conductor with insulating layers arranged according to this invention is shown. In said figure, I represents the first layer; 2 represents the second layer; 3 represents the third layer; 4 is the conductor.

The drawing shows three layers of, for instance, graduated dielectric constant, each layer in such a case of different composition, but it is understood, that the invention is not limited to any special number of layers.

Instead of the layers being graduated according to dielectric constant, all layers can of course be of the same material and dielectric constant, it sometimes being advantageous to apply several layers, even of the same composition instead of a heavy layer, as applicant has found, that the flexibility of such a composite layer is greater, than that of a single heavy layer.

A chemical reaction product according to this invention preferably of the solid type can further be adopted to be applied about an electrical conductor for communication purposes, such as conductors for telegraph, telephone, signal, high frequency currents, etc.

The application of the reaction products or compositions of matter can be made according to any known method in the form of sleeves with or without air core around the corresponding conductors, or as a spacer to separate the sleeves from the corresponding conductors or to separate two concentric conductors, for instance.

Thus the insulating materials according to this invention can be used preferably pure or as plasticizers in known insulating compounds as insulating medium in ordinary air core communication cables, for voice and high frequency currents, in submarine cables and the like.

The insulation can thereby be applied in layers wound around the conductor in order to leave sufficient air space, as in ordinary paper insulated air core cables.

The insulation can also be used as a spacer in known ways, for instance, in the form of a thread spirally wound around the conductor, or in form of discs or the like placed at convenient intervals between the conductor and the insulating sleeve or between two concentric conductors.

The insulation can also be extruded in form of a sleeve and the conductor enclosed therein, said sleeve being provided with protuberances in the walls to center the conductor or to separate adjacent conductors in known ways.

In submarine cables, where high pressure exists around the cable, the insulation can be wound in solid tapes around the conductor, filling the whole space between a conductor and the outside watertight sheath or another conductor.

As a general rule it can be stated, that by substituting known electrically insulating compounds and materials for a compound or an insulation comprising a chemical reaction product according to this invention, a substantially superior electrical insulation will result, principally due to the electrically symmetrical molecules of substantially zero electric dipole moment, as the new insulating materials will have less dielectric losses, especially as regards hysteresis or absorbtion effects of the dielectric.

Lower phase angle difference will also be obtained due to the fact, that no energy need be spent in aligning any unsymmetrical dipoles of the dielectric or in overcoming any electric moments in the electric and/or magnetic fields created by an electric current passed through the conductor insulated by compounds or materials according to this invention.

What I claim is:

1. As a new composition of matter, an electrical insulating material of low hysteresis losses, comprising a polymerization product of a monomeric unsaturated carbocyclic compound having an electrically symmetrical molecular structure and substantially zero electric moment.

2. An electrical insulating composition consisting of a plurality of organic compounds, the monomeric molecules of each compound having an electrically symmetrical molecular structure and having a substantially zero electric moment, at least one of said compounds being a polymerization product of monomeric unsaturated carbocyclic compound.

3. An electric insulating composition consisting of a plurality of organic compounds, the monomeric molecules of each compound having an electrically symmetrical molecular structure and having a substantially zero electric moment, at least one of said compounds being a polymerization product of an electrically symmetrical benzene derivative.

4. An electric insulating composition consisting of a plurality of organic compounds, the monomeric molecules of each compound having an electrically symmetrical molecular structure and having a substantially zero electric moment, at least one of said compounds being a polymerization product of an unsaturated electrically symmetrical polyphenyl compound.

5. An electric insulating composition consisting of a plurality of organic compounds, the monomeric molecules of each compound having an electrically symmetrical molecular structure and having a substantially zero electric moment, at least one of said compounds being a polymerization product of an unsaturated electrically symmetrical naphthalene compound.

6. An electric insulating composition consisting of a plurality of organic compounds, the monomeric molecules of each compound having an electrically symmetrical molecular structure and having a substantially zero electric moment, at least one of said compounds being a polymerization product of an unsaturated anthracene compound.

7. An electrical insulating composition consisting of a plurality of organic compounds, the monomeric molecules of each compound having an electrically symmetrical molecular structure and having a substantially zero electric moment, at least one of said compounds being a polymerization product of an unsaturated electrically symmetrical di-substituted urea compound.

8. An electrical insulating composition consisting of a plurality of organic compounds, the monomeric molecules of each compound having an electrically symmetrical molecular structure and having a substantially zero electric moment, at least one of said compounds being a polymerization product of monomeric unsaturated carbocyclic compound and another is a polymerization product of a monomeric unsaturated aliphatic compound.

9. An electrical insulating composition consisting of a plurality of organic compounds, the monomeric molecules of each compound having an electrically symmetrical molecular structure and having a substantially zero electric moment, at least one of said compounds being a polymerization product of monomeric unsaturated carbocyclic compound and another of the organic compounds is a saturated electrically symmetrical compound.

10. An electrical insulating composition consisting of a plurality of organic compounds, the monomeric molecules of each compound having an electrically symmetrical molecular structure and having a substantially zero electric moment, at least one of said compounds being a polymerization product of monomeric unsaturated carbocyclic compound and another of the organic compounds is a saturated electrically symmetrical carbocyclic compound.

11. An electrical insulating composition consisting of a plurality of organic compounds, the monomeric molecules of each compound having an electrically symmetrical molecular structure and having a substantially zero electric moment, at least one of said compounds being a polymerization product of monomeric unsaturated carbocyclic compound and another of the organic compounds is a saturated electrically symmetrical aliphatic compound.

HELGE ROST.